Feb. 15, 1955　　　M. A. TOWNSEND　　　2,702,357
MULTICATHODE GASEOUS DISCHARGE DEVICE
Filed Dec. 22, 1950　　　　　　　　　　3 Sheets-Sheet 2
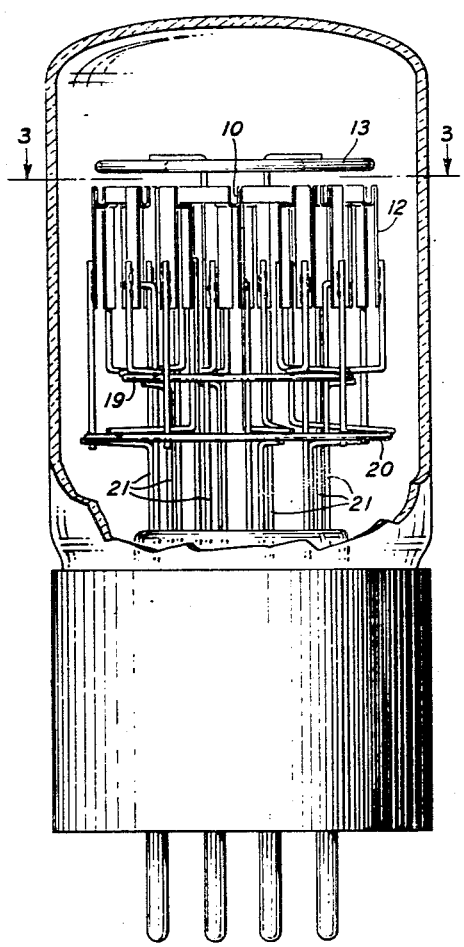
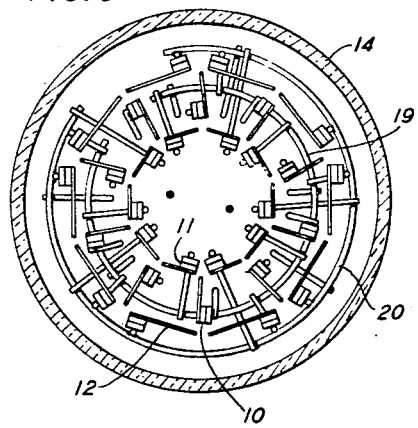
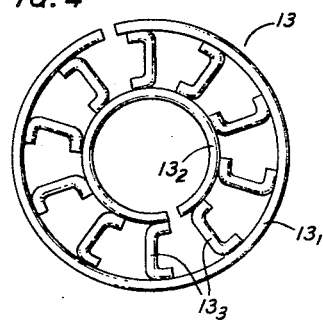
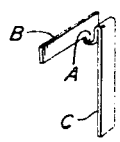
INVENTOR
M. A. TOWNSEND
BY
ATTORNEY Feb. 15, 1955  M. A. TOWNSEND  2,702,357
MULTICATHODE GASEOUS DISCHARGE DEVICE
Filed Dec. 22, 1950  3 Sheets-Sheet 3
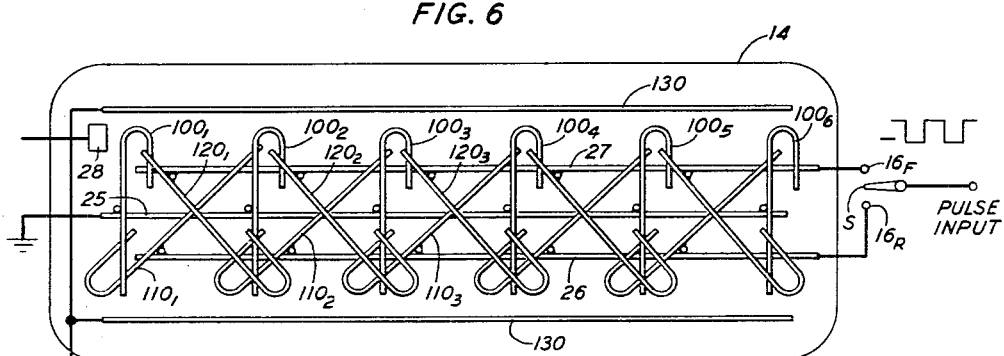
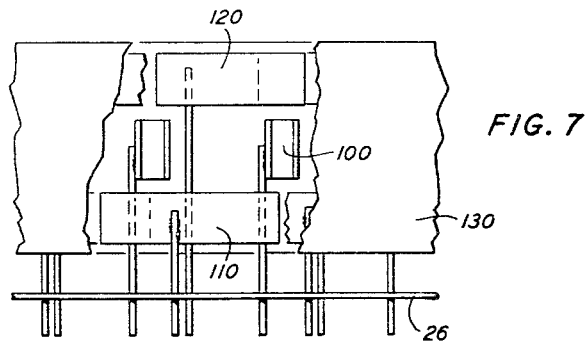
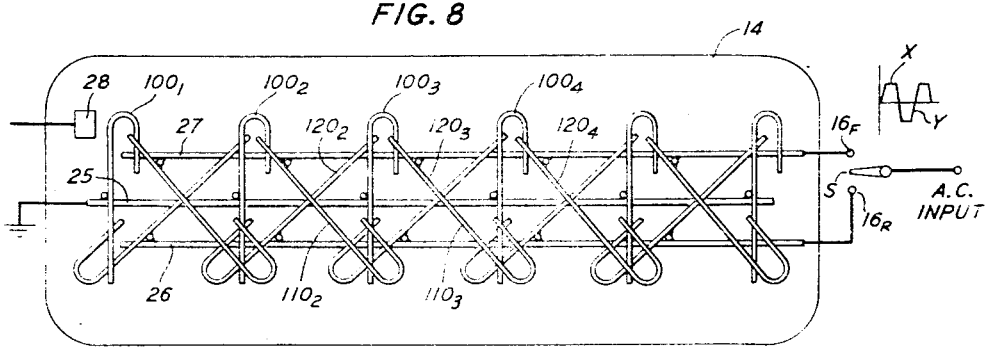
INVENTOR
M. A. TOWNSEND United States Patent Office 2,702,357
Patented Feb. 15, 1955

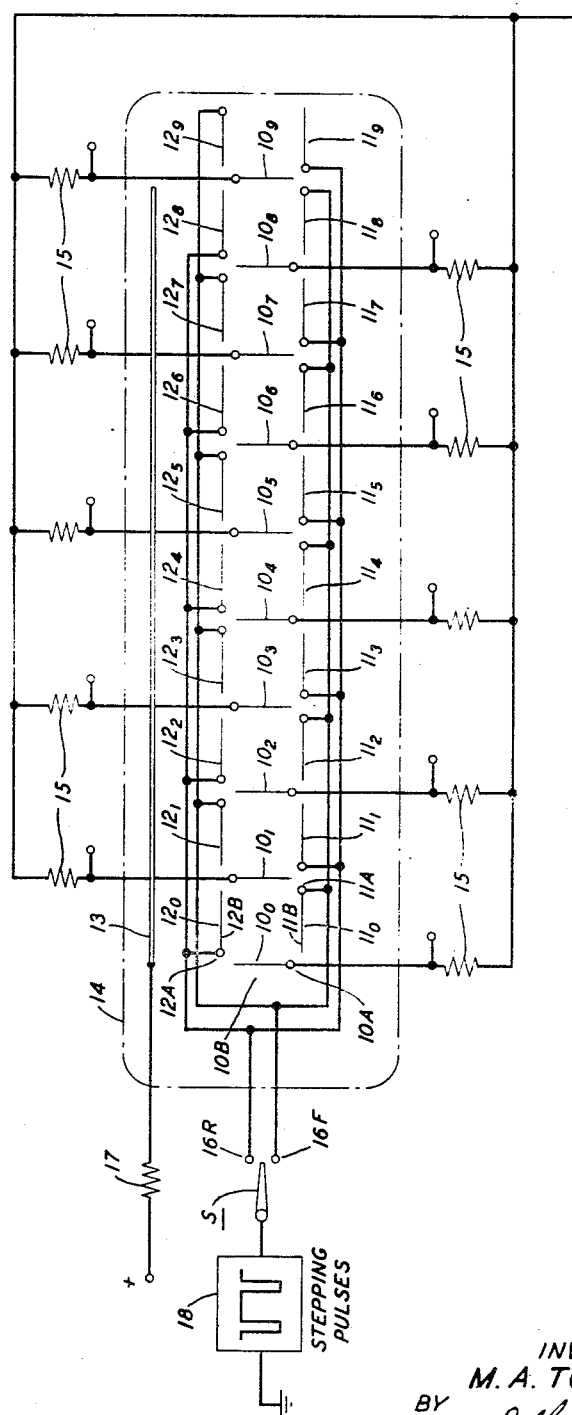
FIG. I

2,702,357

MULTICATHODE GASEOUS DISCHARGE DEVICE

Mark A. Townsend, Berkeley Heights, N. J., assignor to Bell Telephone Laboratories, Incorporated, New York, N. Y., a corporation of New York Application December 22, 1950, Serial No. 202,285

20 Claims. (Cl. 315—168)

This invention relates to gaseous discharge devices and more particularly to multicathode glow discharge devices of the type disclosed in the application Serial No. 101,322 filed June 25, 1949 of M. A. Townsend, now Patent 2,575,370, granted November 20, 1951.

Such devices, which find application in a variety of fields, for example in electronic switching and computing systems, comprise, in general, an array of electrodes, at least alternate electrodes being operable as glow discharge cathodes, and the electrodes being associated electrically in two groups with the electrodes of the two groups in alternate relation. In the operation of the devices, a discharge is initiated from one of the electrodes and then the discharge is stepped along the array in response to the application of signal pulses between the two groups. The stepping may be unidirectional, or bidirectional as disclosed, for example, in the application Serial No. 133,196, filed December 15, 1949 of W. A. Depp, now Patent 2,598,677, granted June 3, 1952.

One general object of this invention is to enhance the flexibility of operation of multicathode glow discharge devices. More specifically, objects of this invention are to simplify the construction of such devices capable of effecting bidirectional stepping of the discharge and to enable bidirectional stepping, in a single device, in response to either direct current or alternating current signal pulses.

In one illustrative embodiment of this invention, a gaseous discharge device comprises a plurality of cathodes mounted in a row, each cathode having opposite end portions of different efficiencies as glow discharge sustaining elements and the several cathodes extending transversely with respect to the direction of the row. Transfer electrodes, which may be of construction similar to that of the cathodes, are provided in cooperative relation with the cathodes.

In accordance with one feature of this invention, the transfer electrodes are mounted in two rows extending parallel to the row of cathodes and each has two portions of different efficiencies as glow discharge elements in juxtaposition to the unlike portions of a respective pair of cathodes. The transfer electrodes are connected electrically in two groups such that the direction of stepping of the discharge is selectively determinable by energization of one or the other group.

The invention and the various features thereof will be understood more clearly and fully from the following detailed description with reference to the accompanying drawing in which:

Fig. 1 illustrates diagrammatically the principal components of a gaseous discharge device constructed in accordance with this invention;

Figs. 2 and 3 are elevational and plan views respectively of a multicathode glow discharge device illustrative of one embodiment of this invention;

Fig. 4 is a plan view of the anode included in the device shown in Figs. 2 and 3;

Fig. 5 is a perspective view of one of the cathodes included in the device shown in Figs. 2 and 3;

Fig. 6 is in part a plan view of a multicathode glow discharge device illustrative of another embodiment of this invention, and in part a circuit diagram;

Fig. 7 is an elevational view of a portion of the device shown in Fig. 6; and

Fig. 8 is a view similar to Fig. 6 of a device illustrative of another embodiment of this invention and particularly suitable for alternating-current operation.

Referring now to the drawing, the device illustrated in Fig. 1 comprises a plurality of cathodes $10_0$ to $10_9$ mounted in a row, each of the cathodes having one end portion, as portion 10A of cathode $10_1$, of relatively high efficiency as a glow discharge sustaining element and having a second end portion, as portion 10B of the cathode $10_1$, of relatively low efficiency as a glow discharge sustaining element. The cathodes extend transversely of the direction in which they are aligned and, as is shown clearly in Fig. 1, adjacent or successive cathodes are transposed whereby the like efficiency ends of the two extend or face in opposite directions.

Adjacent the cathodes 10 are a first group of transfer electrodes $11_0$ to $11_9$, each of these electrodes like the cathodes, having end portions, such as indicated at 11A and 11B in Fig. 1, of relatively high and low efficiency as glow discharge sustaining elements. As shown in the drawing, each of the electrodes 11 is associated with two cathodes 10 and is oriented so that its ends are in juxtaposition to the opposite relative efficiency ends of the associated cathodes. Thus, the low efficiency portion 11B is in juxtaposition to the high efficiency portion 10A of cathode $10_1$ and the high efficiency portion 11A is in juxtaposition to the low efficiency portion of the cathode $10_2$.

Also adjacent the cathodes 10 are a second group of transfer electrodes $12_0$ to $12_9$ which may be of the same construction as the electrodes 11 and relatively oriented with respect to the cathodes in like manner as the electrodes 11.

Adjacent and uniformly spaced from all of the cathodes and transfer electrodes is an anode 13. The several electrodes are mounted within an envelope 14 having therein an ionizable atmosphere, for example of a rare gas or of a mixture of rare gases.

The cathodes 10 are connected together to ground through individual loads indicated by the resistors 15 and the anode 13 is biased positive relative to the cathodes at a potential sufficient to sustain a glow discharge across the cathode-anode gaps, through a resistor 17. The transfer electrodes 11 and 12 are connected in two groups as shown. Specifically, the transfer electrodes $12_1$, $12_3$, $12_5$, $11_2$ and $11_4$, etc. are connected together and to a terminal $16_R$ of a switch S, and the remaining transfer electrodes $11_1$, $11_3$, $11_5$, $12_2$ and $12_4$, etc. are connected in common to the terminal $16_F$ of the switch S. A source 18 of negative stepping pulses is connected to the blade of the switch as shown.

The operation of the device will be understood from the following considerations. Because of the construction of the cathodes and transfer electrodes, whenever a discharge obtains at any one of them the discharge concentrates upon the high efficiency portion A thereof. Thus the low efficiency portion of an associated electrode is in juxtaposition to a region of high ionization density and conditions conducive to ready transfer or shifting of the discharge to such associated electrode are extant.

Assume that a discharge is sustaining at the cathode $10_1$, produced for example by applying a negative pulse to this cathode or transfer of a discharge thereto from another electrode. Assume also that the switch S is closed over the forward terminal $16_F$. When the first negative pulse from source 18 is applied, the transfer electrode $11_1$, and also those connected thereto, are driven negative with respect to the cathodes and, because of the proximity of the electrode $11_1$ to cathode $10_1$ the discharge transfers to the electrode $11_1$. Upon cessation of this pulse, the cathodes become negative relative to the transfer electrodes, so that the discharge shifts or transfers from the electrode $11_1$ to the cathode $10_2$. In response to the application and cessation of another negative stepping pulse, the discharge would shift first to electrode $12_2$ and then to cathode $10_3$. Thus, the discharge can be stepped to the right in Fig. 1 along the row of cathodes, the discharge advancing from one cathode to the next succeeding one for each input pulse.

Assume now that the discharge is sustaining at the cathode $10_3$ and that the switch S is closed over the reverse terminal $16_R$. In response to an input pulse from the source 18, the transfer electrode $11_2$ becomes negative relative to the cathodes and the discharge shifts from cathode $10_3$ to electrode $11_2$. Upon cessation of this pulse, the cathodes become negative relative to the transfer electrodes so that the discharge shifts from electrode $11_2$ to cathode $10_2$. If a second pulse is applied, the discharge will transfer in like manner from cathode $10_2$ to cathode $10_1$ via transfer electrode $12_1$. Thus, with the switch S closed over the reverse terminal $16_R$, the discharge is transferred along the row of cathodes, to the left in Fig. 1 in response to input pulses, the discharge moving from one cathode to the next preceding one for each pulse.

It will be appreciated from the foregoing that the combination illustrated in Fig. 1 provides selective bidirectional stepping of the discharge in response to negative input pulses, the direction of the stepping in response to any pulse being determined by the position of the switch S at the time of application of that pulse. Hence, pulses may be added or subtracted, in effect, the final position of the discharge being representative of the sum or difference of the number of pulses applied to the two terminals $16_F$ and $16_R$. The individual load circuits 15, hence, may be energized in accordance with such sum or difference or these may be counted as in the manner disclosed in the application of M. A. Townsend identified hereinabove.

One physical embodiment of this invention is illustrated in Figs. 2 to 5 inclusive. As there shown, and particularly in Fig. 5, each of the cathodes 10 and transfer electrodes 11 and 12 may be formed of sheet refractory metal and comprises a channel-shaped portion A, a tail portion B and a stem or support portion C. The channel-shaped portion A constitutes a highly efficient glow discharge sustaining element whereas the tail portion B has low efficiency as such an element. The cathodes and transfer electrodes are mounted in circular array and as is particularly clear from Fig. 3 are oriented relatively in the same manner as the corresponding electrodes in Fig. 1. The transfer electrodes are connected in two groups through bus rings 19 and 20 in the manner illustrated in Fig. 1 and described hereinabove, and, as are the cathodes 10, are supported from the stem of the enclosing vessel 14 by rigid conductors 21 which lead to terminal prongs 22 on the base 23.

The anode 13, as shown clearly in Fig. 4, comprises two concentric circular portions $13_1$ and $13_2$ each overlying a respective circular row of transfer electrodes 11 or 12, and radially extending portions $13_3$, one for each cathode and aligned therewith.

In the embodiment of this invention illustrated in Figs. 6 and 7, each of the cathodes 100 and transfer electrodes 110 and 120 comprises a channel-shaped portion A defining a high efficiency glow discharge element and a tail portion B defining a low efficiency glow discharge element. The cathodes 100 may be connected together by a bus bar or tie wire 25, and the transfer electrodes 110 and 120 may be similarly connected in two groups by bus wires 26 and 27 respectively, the connections between electrode and wire being indicated by the dots in Fig. 6.

The several electrodes are mounted in linear array with the cathodes extending transversely and the transfer electrodes disposed diagonally. Each cathode has associated therewith four transfer electrodes, two extending below and two above the cathode. Thus, for example, the cathode $100_3$ has associated therewith the transfer electrodes $110_2$, $110_3$, $120_2$ and $120_3$. As seen best in Fig. 6, the associated cathodes and transfer electrodes have their unlike efficiency portions in juxtaposition, for example the high efficiency channel portion of cathode $100_3$ has in juxtaposition thereto the low efficiency tail portions of the transfer electrodes $110_2$ and $120_3$ and the low efficiency tail portion of the cathode $100_3$ is in juxtaposition to the high efficiency channel portions of the electrodes $120_2$ and $110_3$.

The transfer electrodes 110 are connected via the tie wire 26 to the terminal $16_R$ of the switch S and the electrodes 120 are connected by wire 27 to the switch terminal $16_F$.

Adjacent the cathode $100_1$ is a starter or auxiliary electrode 28 by way of which a discharge may be initiated at this cathode.

The operation of the device will be understood from consideration of an example. Assume that a discharge is sustaining at the cathode $100_3$ and the switch S is closed over the terminal $16_F$. The discharge concentrates at the channel portion of the cathode $100_3$ because of the high efficiency of this portion and, thus, a high ionization density region obtains in proximity to the tail portions of the electrodes $110_2$ and $120_3$. If a negative pulse is applied over the switch S and terminal $16_F$, the electrodes 120 are driven negative relative to the cathodes and the discharge shifts from cathode $100_3$ to electrode $120_3$, concentrating at the channel portion thereof. Upon cessation of the pulse, the cathodes again become negative relative to the transfer electrodes and the discharge transfer to the cathode $100_4$.

If, with the discharge sustaining at cathode $100_3$ and the switch S closed over terminal $16_R$, a negative pulse is applied, the discharge transfers first to the electrode $110_2$ and then, upon cessation of the pulse, to the cathode $100_2$.

Thus, in the device of Figs. 6 and 7, as in that illustrated in Fig. 1 and described heretofore, selective bidirectional stepping of the discharge is realized, the direction of the stepping being determined by the setting of the switch S.

The embodiment of this invention illustrated in Fig. 8 is similar generally to that shown in Figs. 6 and 7 and described hereinabove. However, it does not include a common anode and is adapted particularly for stepping of the discharge in response to alternating-current input signals in a manner analogous to that disclosed in the application Serial No. 202,284 filed December 22, 1950 of M. A. Townsend, now Patent 2,607,015, granted August 12, 1952. Operation of the device involves discharges between adjacent electrodes, one functioning as a cathode and the other as an anode, and transfer of the discharge along the array. A discharge may be initiated in one way, for example, through the agency of an auxiliary electrode 28 as disclosed in the application above identified. The mechanism will be understood from consideration of an example.

Assume that the discharge obtains between the cathode $100_3$ acting as a cathode and the electrode $110_3$ acting as an anode with the switch S closed over terminal $16_F$ and the alternating-current input signal, which is of amplitude sufficient to sustain a discharge between adjacent electrodes, on the positive half cycle as at X in Fig. 8. The discharge concentrates at the channel portion of cathode $100_3$. As the input signal goes through the negative half cycle, as indicated at Y in Fig. 8, the transfer electrodes 110 become negative with respect to the cathodes. Because of this and the preference mechanism provided by the electrode constructions, the discharge transfers to electrode $110_3$ acting as a cathode. Initially, during this half cycle, the cathode $100_3$ functions as an anode but as the discharge concentrates upon the channel portion of electrode $110_3$, cathode $100_4$ takes over as the anode 4 the discharge sustains between transfer electrode $110_3$ and cathode $100_4$. Thus, with the switch S closed over terminal $16_F$, the discharge is stepped to the right in Fig. 8 advancing from one cathode to the next for each cycle of the input signal.

If now, with the switch S closed over terminal $16_R$ a discharge sustains between cathode $100_3$ functioning as a cathode and electrode $120_2$ as anode, this condition obtains for the positive half cycle of the input signal. As this signal passes through its negative half cycle, electrode $120_2$ becomes a cathode with first electrode $100_3$ and then electrode $100_2$ acting as the anode. Thus, the discharge is shifted from one cathode to the next preceding one for each complete cycle of alternating-current input signal.

Hence, it will be noted that the device illustrated in Fig. 8 is bidirectional, the direction of transfer of the discharge being determined by over which of the terminals $16_F$ or $16_R$ the switch S is closed.

Although specific embodiments of this invention have been shown and described, it will be understood that they are but illustrative and that various modifications may be made therein without departing from the scope and spirit of this invention as defined in the appended claims.

What is claimed is:

1. A gaseous discharge device comprising two like rows of similar transfer cathodes, each of said cathodes having two portions of different efficiencies as glow discharge elements, successive cathodes in each row being arranged with their portions of like efficiency in juxtaposition, the cathodes in the two rows being arranged opposite each other and with the higher efficiency portion of each cathode opposite the lower efficiency portion of the corresponding cathode in the other row, and a group of rest cathodes each having two portions of different efficiencies as glow discharge elements, there being one rest cathode for and adjacent each pair of corresponding transfer cathodes in said two rows, each rest cathode being mounted with its two portions in juxtaposition to the unlike portion respectively of the corresponding transfer cathodes.

2. A gaseous discharge device in accordance with claim 1 comprising an anode opposite said transfer and rest cathodes, and means for driving the cathodes in either of the two rows electrically negative relative to said rest cathodes.

3. A gaseous discharge device in accordance with claim 1 comprising means for driving the cathodes in either of said two rows alternately positive and negative relative to said rest cathodes.

4. A gaseous discharge device comprising a plurality of cathodes each having opposite end portions of different efficiencies as glow discharge sustaining elements, said cathodes being mounted in a row and extending transversely with respect to the row, two groups of transfer electrodes, there being one pair of transfer electrodes, one from each group, for each pair of adjacent cathodes and in cooperative relation therewith and each transfer electrode having two portions of different efficiencies as glow discharge sustaining elements, one transfer electrode of each pair having its higher efficiency portion in juxtaposition to the lower efficiency portion of one of the cathodes of the respective pair and its lower efficiency portion in juxtaposition to the higher efficiency portion of the other cathode of the respective pair, and the other transfer electrode of each pair having its higher efficiency portion in juxtaposition to the lower efficiency portion of said other cathode and its lower efficiency portion in juxtaposition to the higher efficiency portion of said one cathode.

5. A gaseous discharge device in accordance with claim 4 comprising means electrically interconnecting said cathodes, an anode opposite said cathodes and transfer electrodes, and means for pulsing either group of transfer electrodes negative with respect to said cathodes.

6. A gaseous discharge device in accordance with claim 4 comprising means electrically connecting said cathodes, means electrically connecting the transfer electrodes of each group, and means for driving either group of transfer electrodes alternately positive and negative relative to said cathodes.

7. A gaseous discharge device comprising a plurality of cathodes, each having a channel portion and a tail portion, mounted in a row and extending transversely with respect to said row, a first and a second group of transfer electrodes each having a channel portion and a tail portion, there being one pair of transfer electrodes, one from each group, for and in cooperative relation with each pair of successive cathodes, one transfer electrode of each pair having its channel portion in juxtaposition to the tail portion of one cathode of the respective pair and its tail portion in juxtaposition to the channel portion of the other cathode of the respective pair, and the other transfer electrode of each pair having its channel portion in juxtaposition to the tail portion of said other cathode and its tail portion in juxtaposition to the channel portion of said one cathode.

8. A gaseous discharge device comprising a plurality of cathodes mounted in a row and each having opposite end portions of different efficiencies as glow discharge sustaining elements, said cathodes extending transversely with respect to said row and successive cathodes having their like end portions facing in opposite directions, a first group of transfer electrodes each having two portions of different efficiencies as glow discharge sustaining elements, there being one transfer electrode for each pair of successive cathodes and each transfer electrode having its low efficiency portion in juxtaposition to the high efficiency portion of the preceding one of the respective cathodes and its high efficiency portion in juxtaposition to the succeeding cathode of the respective pair, and a second group of transfer electrodes one for each pair of successive cathodes and having two portions of different efficiencies as glow discharge sustaining elements, each transfer electrode of said second group having its high efficiency portion in juxtaposition to the low efficiency portion of the preceding respective cathode and its low efficiency portion in juxtaposition to the high efficiency portion of the next succeeding respective cathode.

9. A gaseous discharge device comprising a plurality of similar cathodes mounted in a row and each having opposite end portions of different efficiencies as glow discharge sustaining elements, said cathodes extending transversely with respect to the row and having their like end portions facing in the same direction, a plurality of transfer electrodes, one for each pair of successive cathodes and each having a portion of high efficiency as a glow discharge element in juxtaposition to the low efficiency portion of the preceding cathode of the respective pair and having also a low efficiency portion in juxtaposition to the high efficiency portion of the next succeeding cathode of the respective pair, and a second plurality of transfer electrodes one for each pair of successive cathodes and having a low efficiency portion in juxtaposition to the high efficiency portion of the preceding cathode of the respective pair and having also a high efficiency portion in juxtaposition to the low efficiency portion of the succeeding cathode of the respective pair.

10. A gaseous discharge device comprising a plurality of cathodes mounted in a row and each having a channel portion and a tail portion, said cathodes extending transversely of the row and the tail portions of said cathodes extending in the same direction, and a plurality of pairs of crossed transfer electrodes, one pair for each pair of successive cathodes and extending therebetween, each transfer electrode having a channel portion in juxtaposition to a tail portion of one cathode of the respective pair and a tail portion in juxtaposition to the channel portion of the other cathode of the respective pair.

11. A gaseous discharge device comprising a plurality of glow cathodes mounted in a row and each having opposite end portions of different efficiencies as glow discharge elements, said cathodes extending transversely with respect to the row, means for establishing a discharge to one of said cathodes, and means for stepping the discharge selectively in either direction along the row comprising a plurality of pairs of transfer electrodes, one pair for each pair of successive cathodes and extending therebetween, each transfer electrode extending between the unlike efficiency portions of the respective pair of successive cathodes.

12. A reversible gaseous discharge storage tube of the glow transfer type for storing positive and negative quantities including a single anode; a plurality of stable glow cathodes; a plurality of positive-transfer cathodes coupled to said stable glow cathodes to define a first closed glow transfer path; a plurality of negative-transfer cathodes coupled to said stable glow transfer cathodes to form a second closed glow transfer path.

13. A reversible gaseous discharge storage tube of the glow transfer type for storing positive and negative numbers including a single anode common to all cathodes; ten digit cathodes representing the digits 0–9 inclusive and stable glow discharge positions; ten positive-transfer cathodes interspersed in glow transfer relation with said digit cathodes to form a first closed glow transfer path for effecting step-by-step glow transfer therealong in one direction from one digit cathode to the next in response to each pulse applied to the positive-transfer cathode in glow transfer relation to those two digit cathodes; and ten negative-transfer cathodes interspersed in glow transfer relation with said digit cathodes to form a second closed glow transfer path for effecting step-by-step glow transfer therealong in the other direction from one digit cathode to the next in response to each pulse applied to the negative-transfer cathode in glow transfer relation to those two digit cathodes.

14. A cold cathode sequence discharge tube comprising first, second and third arrays of cathodes aligned in different rows, each cathode comprising at least two contiguous portions cooperating with an anode to form corresponding glow discharge gaps differing in maintaining voltage and saturation current, the like portions of all gaps having substantially the same discharge current voltage characteristics, each cathode of the said first array being positioned opposite a corresponding cathode of the said third array, the pair of cathodes so formed being positioned between a pair of adjacent cathodes of the said second array, this array being aligned along the middle said row, the cathodes of the two said pairs being shaped so that when a pulse is applied in common to all the cathodes of the said first array, a glow discharge which is being maintained at a cathode of the second array may be transferred to the next cathode of the said array in one direction therealong, and that when a pulse is similarly applied to the cathodes of the said third array, the said glow discharge is transferred along the said second array in the reverse direction.

15. The tube set forth in claim 12 including first connections joining all said positive-transfer cathodes; second connections joining all said negative-transfer cathodes; and means connected to apply pulses representing a positive quantity in true form to said first connections to effect storage thereof and to apply pulses representing a negative quantity in true form to said second connections to effect storage thereof.

16. A reversible gaseous discharge storage device of the glow transfer type for storing positive and negative numbers including anode means common to all cathodes; ten digit cathodes representing ten stable glow positions and the digits 0–9 inclusive, first glow transfer means for effecting glow transfer from one digit cathode to the next higher one in response to each pulse applied thereto; second glow transfer means for effecting glow transfer from one digit cathode to the next lower one in response to each pulse applied thereto.

17. The tube set forth in claim 16 including means connected to said first glow transfer means for applying pulses thereto equal in number to the positive number to be stored; means connected to said second glow transfer means for applying pulses thereto equal in number to the negative number to be stored; carry and borrow transfer means connected to the digit cathodes representing the digits 9 and 0 respectively, for transferring a carry and borrow pulse therefrom when a glow discharge leaves those respective cathodes.

18. The tube set forth in claim 17, including read-out transfer means connected to the digit cathode representing the digit 0; means connected to apply read-out pulses to said first and second glow transfer means, respectively, when the negative balance stored is positive and negative; whereby a positive and a negative balance is read-out in true form.

19. The tube set forth in claim 13 including individual output connections from the digit cathodes representing the digits 9 and 0; whereby positive and negative numbers to be stored are read-in in true form and the balance stored is read-out in true form.

20. In a gaseous discharge storage tube of the glow transfer type including a number of digit cathodes equal to the digital storage capacity of the tube, each cathode constituting a terminal of stable glow discharge; first transfer means coupling said digit cathodes to effect glow transfer in one direction along a first closed glow transfer path; and second transfer means coupling said digit cathodes to effect glow transfer in the other direction along a second closed glow transfer path.

No references cited.